United States Patent [19]

Young

[11] Patent Number: 5,425,680
[45] Date of Patent: Jun. 20, 1995

[54] SNAP-FIT CHAIN TENSIONER APPARATUS AND METHOD

[75] Inventor: James D. Young, Chesaning, Mich.

[73] Assignee: Cloyes Gear & Products, Inc., Willoughby, Ohio

[21] Appl. No.: 277,179

[22] Filed: Jul. 19, 1994

[51] Int. Cl.[6] .............................................. F16H 7/00
[52] U.S. Cl. .................................................... 474/111
[58] Field of Search ........ 474/101, 109, 111, 113–117, 474/140

[56] References Cited

U.S. PATENT DOCUMENTS

| | | | |
|---|---|---|---|
| 2,129,107 | 9/1938 | Taylor | 74/242.11 |
| 3,276,282 | 10/1966 | Duncan | 74/242.11 |
| 3,490,302 | 1/1970 | Turner et al. | 74/242.11 |
| 4,193,314 | 3/1980 | Horner et al. | 74/242.5 |
| 4,713,043 | 12/1987 | Biedermann | 474/111 |
| 4,921,472 | 5/1990 | Young | 474/111 |
| 5,045,032 | 9/1991 | Suzuki et al. | 474/140 |
| 5,055,088 | 10/1991 | Cradduck et al. | 474/111 |
| 5,184,983 | 2/1993 | Shimaya et al. | 474/111 |
| 5,222,917 | 6/1993 | Shimaya et al. | 474/111 X |
| 5,266,066 | 11/1993 | White | 474/111 |
| 5,286,234 | 2/1994 | Young | 474/111 |
| 5,318,482 | 6/1994 | Sato et al. | 474/111 X |

FOREIGN PATENT DOCUMENTS

| | | |
|---|---|---|
| 2431425A1 | 1/1976 | Germany . |
| 3049106A1 | 7/1982 | Germany . |
| 57-134055 | 8/1982 | Japan . |
| 742092 | 12/1955 | United Kingdom . |
| 2069656A | 8/1981 | United Kingdom . |

*Primary Examiner*—Michael Powell Buiz
*Attorney, Agent, or Firm*—Fay, Sharpe, Beall, Fagan, Minnich & McKee

[57] ABSTRACT

A chain tensioner for tensioning a chain mounted on a support structure. The tensioner (10) includes a bracket (46) secured to a support structure (46) and a pin (56) connected to the bracket. Further included is an elongated shoe (26) having first and second enlarged ends (28, 30) an exterior wall surface (34) extending the length thereof to engage a chain (14), a blade spring (48) disposed within the shoe (26) generally parallel to the wall surface (34), a generally semi-cylindrical indentation (58) extending through the first end (28) to engage the pin (56).

8 Claims, 3 Drawing Sheets

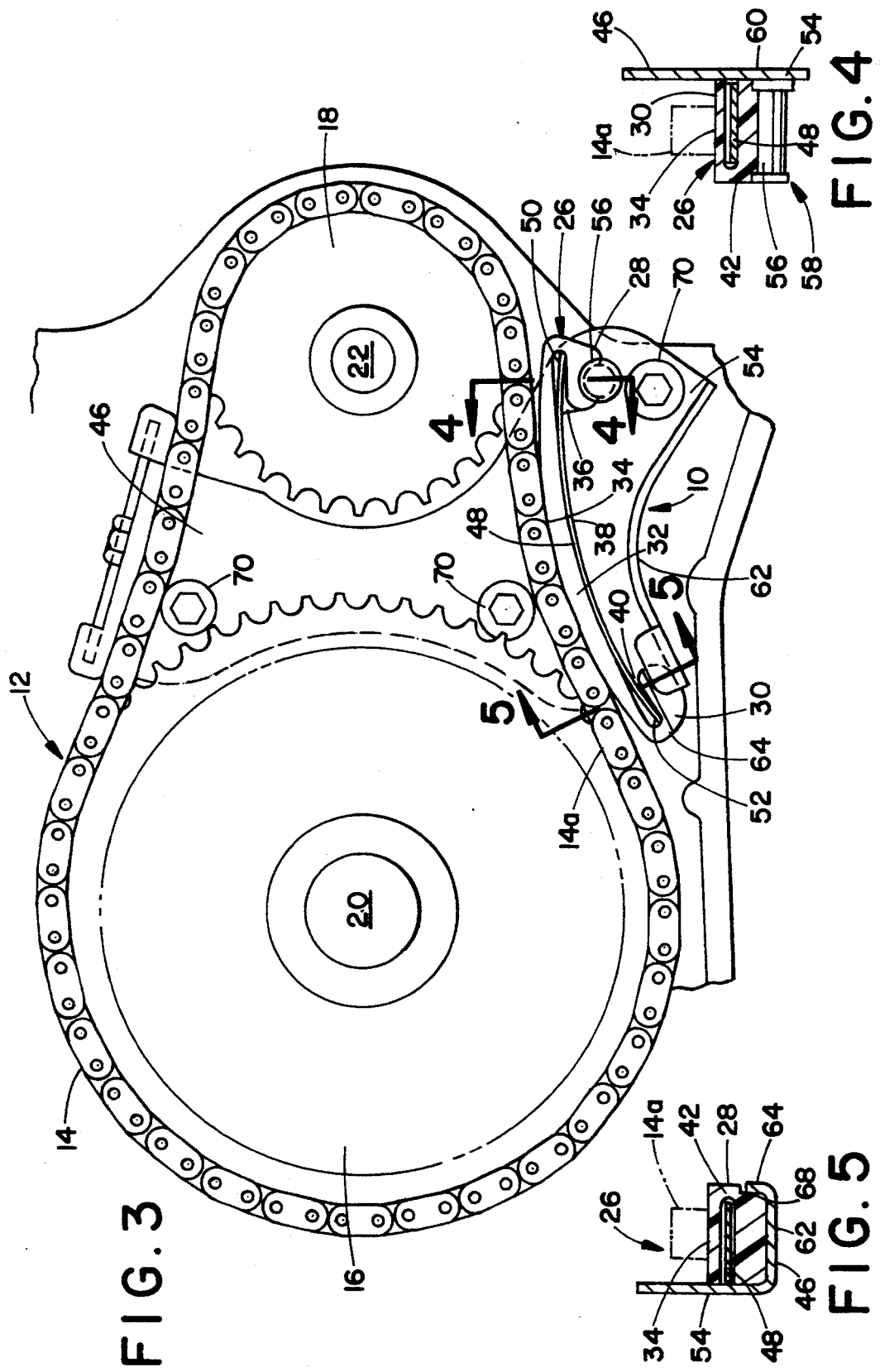

SNAP-FIT CHAIN TENSIONER APPARATUS AND METHOD

BACKGROUND OF THE INVENTION

The subject invention is directed toward the art of chain power drives and, more particularly, to a chain guide and tensioner apparatus and related method useful in confined spaces for applying a tensioning force to a chain traveling therepast. The subject innovation provides a convenient snap-fit assembly taking advantage of a geometric interface between components to simplify installation.

While the invention is particularly directed to the art of chain power drives, and will be thus described with specific reference thereto, it will be appreciated that the invention may have usefulness in other fields and applications.

Several prior art patents show chain tensioner devices that include a chain engaging shoe member formed from a plastic material with a metal spring or bracket incorporated therein to provide the shoe with the necessary resiliency and rigidity while taking advantage of the material's low friction and good wear characteristics. For example, my prior U.S. Pat. No. 4,921,472 discloses a chain tensioner wherein a blade spring is received in longitudinal passageways formed in a plastic shoe. The spring is retained in longitudinal position by internal shoulders in the passageways. Lateral positioning and retention is achieved by cooperation between longitudinal slots in the ends of the spring and central internal walls in the passageways.

Additionally, my prior U.S. Pat. No. 5,286,234 teaches a chain tensioner comprising an elongated shoe formed of a resinous plastic material and having first and second longitudinally spaced enlarged ends joined by a relatively narrow, resilient central body section. The shoe has a first exterior wall surface which extends the length thereof and is adapted to engage the chain to be tightened. Narrow slots extend laterally into the enlarged ends generally parallel to the first exterior wall surface. A blade spring having a length nearly as great as the shoe and terminating in first and second ends is received in the slot to extend longitudinally of the shoe generally parallel to the first exterior wall. A rigid metal support bracket is provided for mounting the shoe adjacent the chain to be tightened. The bracket has 1) a side wall engaging a side of the shoe and overlying the slots for retaining the blade spring in the slots, and 2) a pivot pin arrangement for retaining the shoe and blade on the bracket.

A consideration with my prior designs, as well as other prior art designs, is that it is desirable for spring length to be maximum. Increased spring length provides favorable results respecting working travel of the tensioner, which is the allowable angular, or vertical, deflection of the free end of the shoe/blade relative to the retained end, take-up capability, which is the ability of the tensioner to reduce or "take-up" any slack in the chain, and spring force throughout the life of the device.

Another consideration for most applications is that, typically, the whole tensioner, including the shoe and blade, is first installed on the engine block, and then the chain and sprockets are installed. For example, FIGS. 1 and 2 show an installation pin P holding the shoe S1 and blade B in proper position during installation. The pin P is then removed after the chain C and sprockets S2 are installed.

Another method of retaining the blade B prior to and during installation is to locate a pin or clip near the mid-point of the blade. While this mid-blade pin location serves to reduce the complexity of the blade, it also adds further to the complexity and cost of the bracket.

The pin P is used to prevent the profile of the combination of the blade B and the shoe S1 from intruding into the plane of the chain C as the chain C and sprockets S2 are installed. Additionally, the blade B and shoe S1 are retained by pin P to allow for the installation of the shortest possible chain. Moreover, the tolerances associated with the installed tensioner retained by the pin P affect the arrangement. Accordingly, the blade B and shoe S1 are retained in a position to accommodate both a sufficient clearance for installation and the "build stack-up", or accumulation, of component and fastener location tolerances.

An assembly of this type has reduced tension or take-up capability since the blade B must move into the chain C, once the pin P is removed, prior to any system wear taking place. Moreover, balancing all of these factors against the desire to use a blade (shoe) of maximum length, results in a chain tensioner that is shorter, somewhat more complex and, consequently, more expensive than is desirable, due to the necessity of accommodating an installation pin.

BRIEF DESCRIPTION OF THE DRAWINGS

The present invention exists in the construction, arrangement, and combination of the various parts of the device, whereby the objects contemplated are attained as hereinafter more particularly set forth, specifically pointed out in the claims, and illustrated in the accompanying drawings in which:

FIG. 3 is a profile view of a chain drive mechanism having a tensioning apparatus formed in accordance with the present invention;

FIG. 4 is a cross sectional view along line 4—4 of FIG. 3;

FIG. 5 is a cross sectional view along line 5—5 of FIG. 3; and,

SUMMARY OF THE INVENTION

Figure 1:
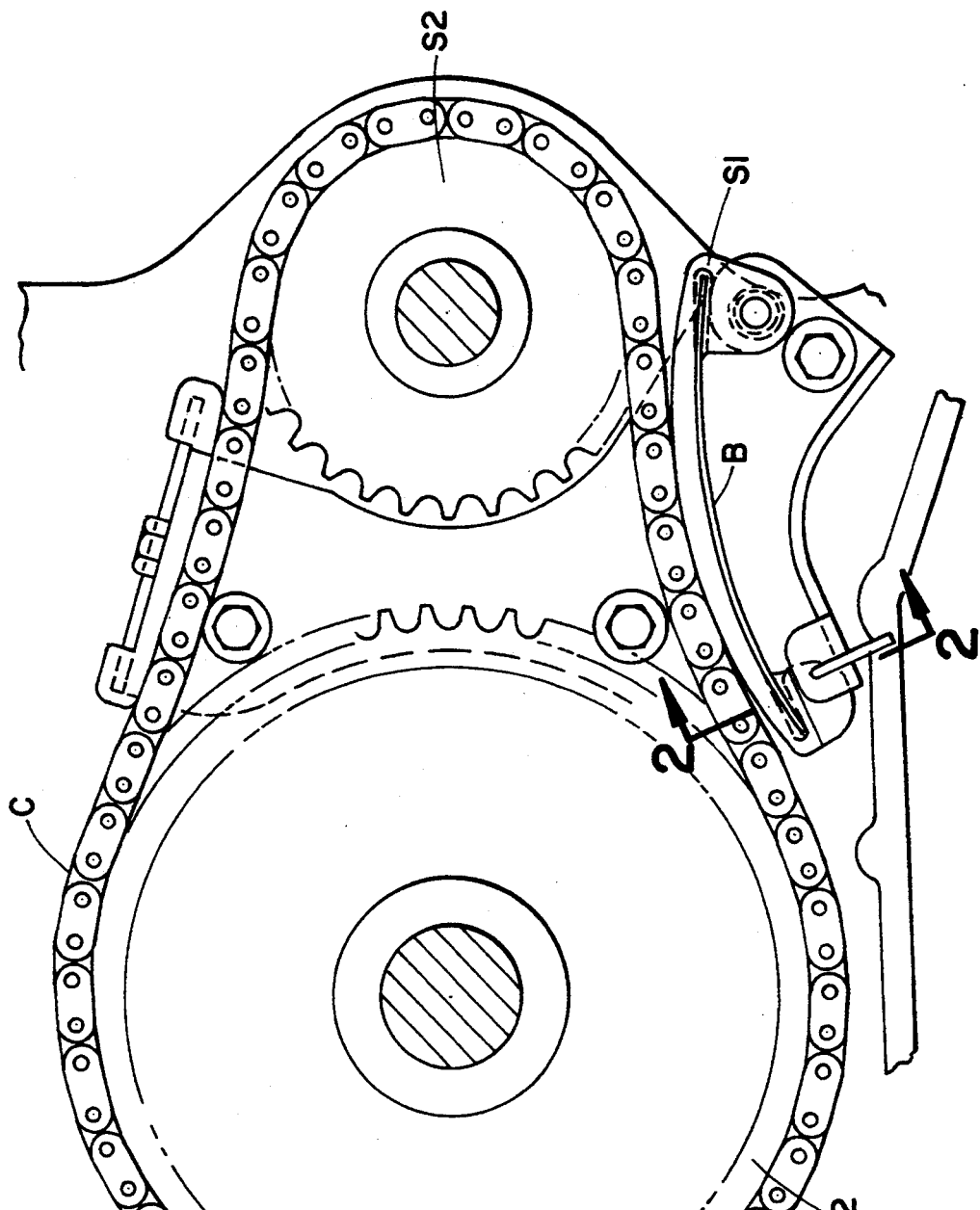
FIG. 1 is a profile view of a chain drive mechanism having a tensioning apparatus of the prior art.
Figure 2:
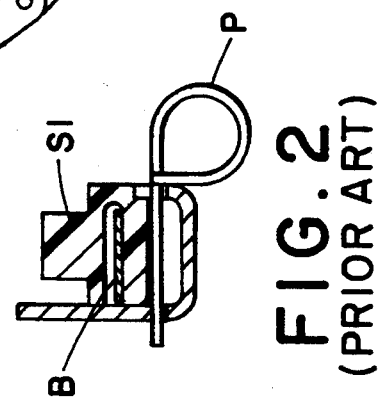
FIG. 2 is a cross sectional view along line 2—2 of FIG. 1.

The present invention is directed to a chain guide and tensioner apparatus, and related method, useful for applying a tensioning force to a chain traveling therepast. The chain tensioner includes a bracket secured to a support structure on which a plastic shoe is disposed to apply tension to a chain.

In one aspect of the invention, a pivot pin connected to the bracket, an elongated shoe having first and second enlarged ends, and a generally semi-cylindrical indentation extending through the first end, for engaging, or snap-fitting on, the pivot pin, are provided.

In a more limited aspect of the invention, the shoe has an exterior wall surface extending the length thereof to engage the chain and a blade spring disposed therein generally parallel to the wall surface.

An advantage of the present invention is that the design allows for a longer blade and thermoplastic shoe to increase working travel and enhance spring load characteristics. An installation pin is not required so the length of the second end of the elongated shoe is increased.

Another advantage of the present invention is that since an installation pin is not required, the complexity and cost of the bracket and the shoe are reduced.

A still further advantage of the present invention is that installation of the chain, sprockets and tensioning device is greatly simplified.

A still further advantage of the present invention is that the design minimizes "take up" losses to thereby provide improved working travel.

Further advantages and scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DETAILED DESCRIPTION OF THE PREFERRED EMBODIMENT

Referring more particularly to the drawings wherein the showings are for the purpose of illustrating a preferred embodiment of the invention only, and not for the purpose of limiting same, FIG. 3 shows the overall arrangement of an improved chain tensioning apparatus, or tensioner, 10 associated with a conventional chain drive of the type often used on internal combustion engines for timing purposes. The apparatus 10 is particularly useful in short center distance cam-in-block automotive engine camshaft drives where minimal available packaging space adversely influences blade spring length.

In the subject embodiment, as shown, the chain drive assembly 12 is illustrated as comprising a chain 14 connected to drive between a pair of spaced sprockets 16 and 18 respectively mounted on shafts 20 and 22. The run 14a of the chain 14 is engaged by the tensioning assembly 10 in a conventional manner which will subsequently be described in greater detail. For present purposes, attention is also directed to FIGS. 4 through 5 which illustrate in greater detail the various construction and design features of the subject invention.

As illustrated in FIGS. 3-5, the tensioning assembly 10 comprises an elongated shoe member 26 which is formed of a suitable resinous plastic material, such as heat stabilized nylon or other engineering plastic, which has the necessary rigidity and load-carrying capabilities under elevated temperatures that might be encountered in an engine environment.

In the embodiment illustrated, the shoe 26 has first and second enlarged, or barrel, end portions 28 and 30 that are joined by a relatively thin and flexible central section 32. A first exterior guide surface 34 extends the length of the lateral side of the body between the first end 28 and the second end 30. Surface 34 is relatively flat and is adapted to engage and apply the necessary tension forces to the chain run 14a. The surface 34 is flat in its width direction (FIGS. 4 and 5), but is slightly curved throughout its length (FIG. 3).

The enlarged first end 28 of the shoe 26 is provided with a laterally inwardly extending, relatively narrow slot 36 as shown. Slot 36 extends inwardly from one lateral side nearly completely through the width dimension of the end portion 28 and is in alignment with a second exterior surface 38 formed on the central body section 32. It should be noted that exterior surface 38 is generally parallel to the first exterior guide surface 34.

The second enlarged end portion 30 is likewise provided with a relatively narrow, laterally inwardly extending slot 40 which is also aligned with the surface 38 and the opposite end slot 36. Slot 40, like slot 36, extends inwardly substantially the full width of the shoe 26. As can be seen from FIGS. 4 and 5, the slots 36 and 40 terminate adjacent a wall 42 which is relatively thin.

As shown in FIGS. 3-5, it should be noted that the assembly further includes a blade spring member 48 which is of a generally rectangular configuration with a length only slightly less than the overall length of the shoe 26. The width of the blade spring 48 is only slightly less than the total width of the shoe 26. The spring 48 functions to provide the necessary longitudinal rigidity and lateral flexibility required for the shoe 26. The spring 48 of the subject embodiment is received laterally into the shoe 26 with its respective first and second ends 50, 52 received in the slots 36, 40 of the first and second ends 28, 30 of the shoe 26. The relative sizes of the slots 36 and 40 compared to the spring 48 are such as to allow the spring to completely fill the slots in their lateral depth direction as illustrated in FIGS. 4 and 5. The spring is thus basically a full width spring with no slots or mounting openings formed therein. It can have, as shown, a simple rectangular configuration of uniform width throughout its length. Additionally, as can be seen, the slots 36, 40 are simple slots with no complex internal shoulders, walls, tabs, or the like.

Spring 48 is retained in position in the shoe 26 by the previously-mentioned mounting bracket 46. As shown, the mounting bracket 46 includes a lateral side wall 54 that overlies the open side of the slots 36, 40.

The shoe 26 is retained in position on the bracket 46 by having its first end 28 pivotally engaging the bracket 46 through a transversely extending pivot pin 56 which passes through transversely extending indentation, or concave cut out portion, 58 formed in the first end 28 to provide an "open" or partial barrel end. Suitable opening 60 formed as shown on bracket 46 is provided to receive the pivot pin.

The indentation, or concave portion, 58 is preferably semicylindrical and disposed on an edge of the enlarged first end 28 to engage the pin 56. As shown in FIG. 4, the indentation 58 facilitates positioning of the shoe 26 between the pin 56 and the chain run 14a. Any position or shape of indentation 58 is acceptable so long as it cooperates to fit the pin 56 and allows for a "snap-fit" to be subsequently described. Likewise, the pin 56 may be of any shape or configuration to accommodate a snap-fit arrangement.

As illustrated in FIGS. 3 and 5, a suitable strengthening flange, or guide, 62 extends across the entire width of the bracket 46 closely adjacent the shoe 26. At the left-hand end of flange 62, there is a laterally extending retaining tab means 64. The retaining tab means 64 is spaced outwardly from the side wall 54 a distance such that it engages the upper surface 68 of the enlarged end 30 of shoe 26. The tab retaining means 64 thus acts to retain the shoe 26 in proper lateral relationship with the bracket 46 while permitting limited pivoting movement about pin 56. Additionally, the shoe 26 can flex, and the distance between the enlarged ends 28 and 30 change as necessary during the lateral flexure of the shoe 26.

As can be appreciated, the bracket 46 can be mounted relative to the chain drive in any convenient manner. In the subject embodiment, it is mounted so as to have some shifting or tilting movement by being carried on suitable bolts or studs 70 (FIGS. 3 and 6) connected to an associated support structure such as an engine block, not shown.

With respect to the method for installing the chain tensioning apparatus 10 of the present invention, unlike the prior art devices, the present development allows for the installation of first, the bracket 46; second, the chain and sprockets; and, third, the shoe 26 and blade 48. Installing the shoe 26 and blade 48 last in the sequence provides significant practical advantages in that the sprockets 16, 18, having the chain 14 disposed therearound, are installed on the shafts 20, 22, and all critical initial tensioning adjusted, before the shoe 26 and blade 48 are engaged or even positioned on the bracket 46. Shoe 26 is, thus, not in a position to interfere with any initial adjustment of the chain. Since no assembly clearance is required, as the chain is already in place when the shoe is installed, and the tolerances related to the tensioning apparatus 10 are not even taken into account, as the apparatus is installed last, installation is greatly simplified.

Figure 6:
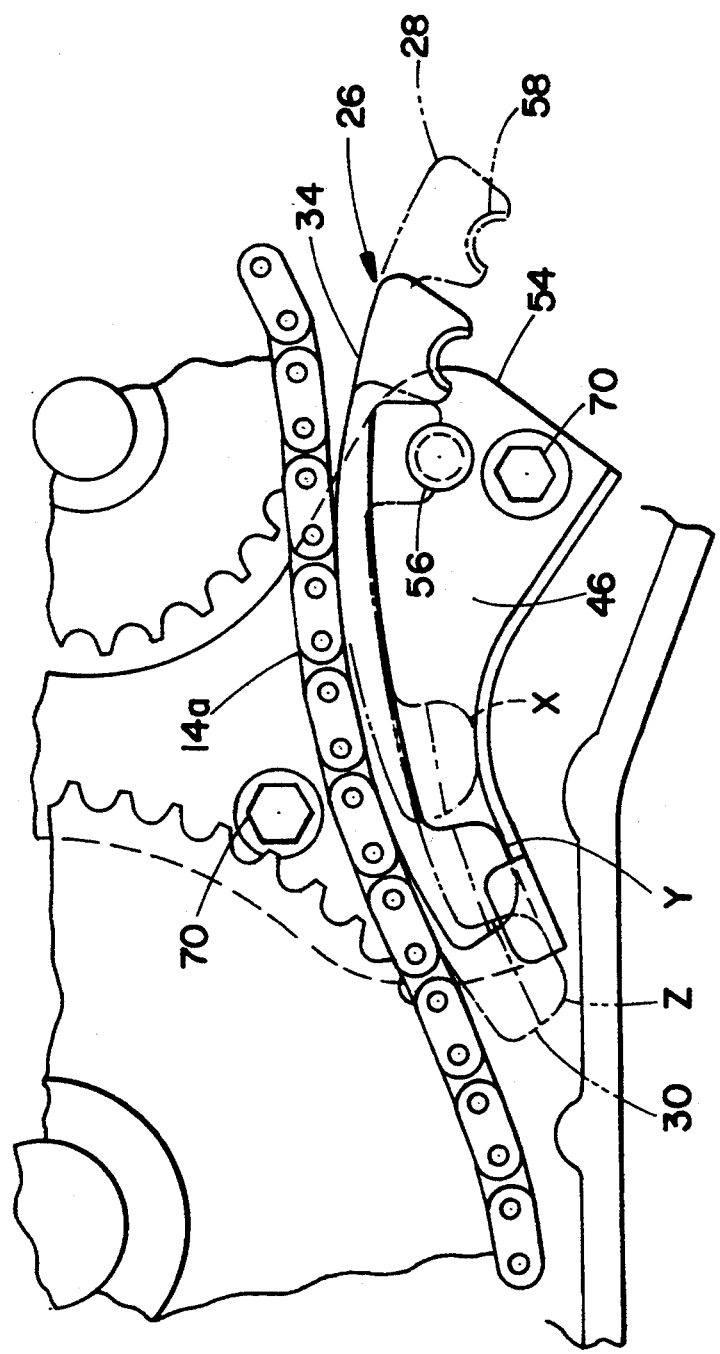
FIG. 6 is a profile view of the shoe and blade combination of the tensioning apparatus of FIG. 3 being installed in the chain drive mechanism.

Referring now to FIG. 6, the shoe 26 including the blade 48 is positioned flush to the bracket 46 to engage pin 56 by, first, pushing the end 30 between the chain run 14a and pivot pin 56 so that the surface 34 engages the chain run 14a and the open ends of slots 36 and 40 oppose the side wall 54. Continuous force is applied to the shoe 26 until the indentation 58 engages the pin 56 by snap-fitting the end 28 into a position to permit such engagement.

While being snap-fit, the blade 48 and shoe 26 undergo suitable deflection. Also as shown, the shoe is translated from position X to position Y to position Z in the process.

Once the shoe 26 is installed in its proper position, the dynamics of a firing engine will not dislodge the shoe 26. Drive rotation is clockwise and the chain/plastic interface imposes only a modest frictional force compared to the pivot reaction on the pin 56.

Further advantages of the present design are numerous. An installation pin as described in connection with the prior art, is not required, since the shoe and blade are installed after the chain and sprockets. Formation and construction of both the shoe and the bracket are thus simplified. Further, in this regard, total installation is improved and simplified.

Significantly, the configuration of the present apparatus permits increased length of the shoe 26 since the end 30 is not required to accommodate an installation pin 56. As previously noted, increased spring length results in greater spring force throughout the life of the blade 48 and improved working travel and take-up capability of the tensioner 10.

As alluded to above, the snap-fit design inherently minimizes take-up losses since it is not necessary to design in assembly clearance as the chain is already in place when the blade is installed. Build stack-up of tolerances is also reduced since the chain tensioning device 10, having both fastener and component tolerances associated therewith, is installed last.

Additionally, for both prior art and the present devices, maximum working travel is achieved by designing the spring deflection to be at a maximum bending stress level at installation. Accordingly, the assembly clearance required for the prior art devices results in less effective working travel than the device of the present invention. Additionally, spring thickness and radius of curvature (free height) of the tensioning device 10 are conveniently varied to achieve desired spring load and max stress level.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. In a chain tensioner having an elongated shoe having first and second longitudinally spaced enlarged ends joined by a central body section, the shoe being formed of a synthetic plastic and having a first exterior wall surface extending the length thereof adapted to engage the chain to be tensioned, narrow slots extending laterally into the enlarged ends generally parallel to the first exterior wall surface, a blade spring having a length nearly as great as the shoe and terminating in first and second ends received respectively in the slots in the first and second ends of the shoe to extend longitudinally of the shoe generally parallel to the first exterior wall and a rigid metal support bracket for mounting the shoe adjacent the chain to be tightened, the bracket having a side wall engaging a side of the shoe and overlying the slots for retaining the blade spring in the slots, and a pivot pin to retain the shoe and allow angular deflection thereof, the improvement comprising:

a generally semicylindrical cutout portion on the first enlarged end engaging the pivot pin to retain the shoe in engagement with the chain.

2. A chain tensioning apparatus for tensioning a chain mounted on a support structure, the apparatus comprising:

a bracket secured to the support structure;

a pin connected to the bracket; and an elongated shoe having first and second enlarged ends and an indentation extending through the first end engaging the pin.

3. The tensioner of claim 2 wherein the shoe comprises an exterior wall surface extending the length of the shoe adapted to engage the chain.

4. The tensioner of claim 3 further comprising a spring blade disposed with the shoe generally parallel to the wall surface.

5. The tensioner of claim 2 wherein the indentation is defined by a semicylindrical concave cut out portion of the first end.

6. A chain tensioner for tensioning a chain mounted on a support structure, the tensioner comprising:

a bracket secured to the support structure;

a pin connected to the bracket; and an elongated shoe having first and second enlarged ends, an exterior wall surface extending the length thereof adapted to engage the chain, a blade spring disposed within the shoe generally parallel to the wall surface, and a generally semicylindrical indentation extending through the first end engaging the pin.

7. A chain tensioner for tensioning a chain mounted on a support structure, the tensioner comprising:

a bracket secured to the support structure;

a pin connected to the bracket; and an elongated shoe having means disposed on an enlarged end of said shoe for facilitating a snap fitting of the shoe to the pin.

8. A chain tensioning method in a system having a chain, sprockets, a bracket having an opening, a pivot pin, a shoe having first and second enlarged ends, the first end having a generally semicylindrical indentation extending therethrough, the method comprising steps of:

disposing the pivot pin in the opening of the bracket;

mounting the bracket to a support structure;

installing the chain on the sprockets;

mounting the chain and sprockets to the support structure in proximity of the bracket so that the bracket is disposed between the support structure and a run of the chain; and, installing the shoe by sliding the second end of the shoe between the run of the chain and the pivot pin and subsequently engaging the indentation of the first end of the shoe to the pivot pin whereby the first end is snap fit on the pivot pin.

* * * * *